United States Patent [19]
Ghosh et al.

[11] Patent Number: 6,142,308
[45] Date of Patent: *Nov. 7, 2000

[54] PROCESS OF AND APPARATUS FOR SEPARATING COMPONENTS OF FREE-FLOWING MATERIAL CONTAINED IN A CARRIER

[75] Inventors: Sakti Ghosh; Michael Coxon; Klaus Gnegel, all of Oelde, Germany

[73] Assignee: Ventilatorenfabrik Oelde GmbH, Oelde, Germany

[*] Notice: This patent issued on a continued prosecution application filed under 37 CFR 1.53(d), and is subject to the twenty year patent term provisions of 35 U.S.C. 154(a)(2).

[21] Appl. No.: 09/374,141

[22] Filed: Aug. 11, 1999

[30] Foreign Application Priority Data

Aug. 31, 1998 [EP] European Pat. Off. ............... 98 16413

[51] Int. Cl.[7] .................. B03B 1/00; B03D 3/00
[52] U.S. Cl. .............. 209/3; 209/234; 209/311; 209/314; 241/1; 241/39; 241/19
[58] Field of Search .................. 209/3, 234, 311, 209/314, 315; 83/98; 241/1, 5, 39, 18, 19

[56] References Cited

U.S. PATENT DOCUMENTS

| | | | |
|---|---|---|---|
| 825,390 | 7/1906 | Hill | 209/314 |
| 2,393,783 | 1/1946 | Kridel | 241/1 |
| 2,588,088 | 3/1952 | Cover | 209/314 |
| 3,642,133 | 2/1972 | Vananzetti | 209/314 |
| 3,909,397 | 9/1975 | Aldinger . | |
| 4,082,657 | 4/1978 | Gage | 209/413 |
| 4,303,501 | 12/1981 | Steffens . | |
| 4,305,507 | 12/1981 | Wittkopf | 209/3 |
| 4,500,040 | 2/1985 | Steffens | 241/14 |
| 4,637,096 | 1/1987 | Wise et al. . | |
| 4,986,479 | 1/1991 | Swarden et al. | 241/15 |
| 4,990,244 | 2/1991 | Anderson | 209/2 |
| 5,035,362 | 7/1991 | Marzurkiewicz | 241/1 |
| 5,225,045 | 7/1993 | Watson | 162/4 |
| 5,341,939 | 8/1994 | Aitchison et al. | 209/319 |
| 5,392,925 | 2/1995 | Seyffert | 209/405 |
| 5,614,094 | 3/1997 | Deister et al. | 209/315 |
| 5,618,003 | 4/1997 | Akiyoshi et al. | 241/19 |
| 5,641,070 | 6/1997 | Seyffert | 209/314 |

FOREIGN PATENT DOCUMENTS

| | | |
|---|---|---|
| 0 739 657 A1 | 10/1996 | European Pat. Off. . |
| 2704035A | 8/1978 | Germany . |
| 38 09 255 A1 | 9/1989 | Germany . |
| 196 31 442 A1 | 2/1998 | Germany . |

*Primary Examiner*—Donald P. Walsh
*Assistant Examiner*—David A Jones
*Attorney, Agent, or Firm*—Henry M. Feiereisen

[57] ABSTRACT

An apparatus for separating components of free-flowing material contained in a cotton-like, mat-like carrier, includes an air accelerator providing an accelerated air stream for tearing apart the carrier to form flakes. Positioned downstream of the air accelerator is a separation deck which includes a screen surface and a trough. A vibratory unit is associated to the separation deck for oscillation thereof, thereby realizing a separation of the components.

15 Claims, 3 Drawing Sheets

PROCESS OF AND APPARATUS FOR SEPARATING COMPONENTS OF FREE-FLOWING MATERIAL CONTAINED IN A CARRIER

CROSS-REFERENCES TO RELATED APPLICATIONS

This application claims the priority of European Patent Application Serial No. 98 116 413.0, filed Aug. 31, 1998, the subject matter of which is incorporated herein by reference.

BACKGROUND OF THE INVENTION

The present invention relates, in general, to a separation process, and more particularly to a process of separating components of free-flowing material contained in a cotton-type, mat-like carrier. The present invention further relates to an apparatus for carrying out the process.

In manufacturing hygienic materials, such as diapers, incontinence products or the like, high-grade absorbent material employed for absorbing moisture and embedded in a carrier besides cellulose flakes. These kinds of series products are fabricated on a large scale so that certain quantities of waste are necessarily produced. In order to recover this waste material, the employed materials must be thoroughly screened. A precise separation of material components with defined properties is needed to ensure an exact apportioning without decrease in quality. Heretofore, this was not possible to a desired extent so that the waste material must be energetically disposed of and stored in waste dumps. In particular, when taking into account the enormous amounts of hygienic articles being made and the resultant absolute amounts of waste, recycling becomes of particular importance.

Attempts were made to dissolve the compacted cotton-type cellulose carrier with embedded absorbent material in a mechanical fashion, e.g. by means of tearing drums or cutting units, as to effect a separation between cellulose flakes and absorbent material. However, to date the attained degree of separation is poor and thus not viable in an economic sense. Moreover, the processes utilized so far are prone to mechanical failure, and, apart from the attained insufficient degree of separation of the flakes at varying concentration of absorbent material, are complex and uneconomical.

SUMMARY OF THE INVENTION

It is thus an object of the present invention to provide an improved process of separating components of a carrier containing free-flowing material, obviating the afore-stated drawbacks.

In particular, it is an object of the present invention to provide an improved process of separating components of a carrier containing free-flowing material, realizing a reproducible, high degree of separation while still exhibiting a high operational safety so as to be useable for a production on a large scale in a cost-efficient manner.

These objects, and others which will become apparent hereinafter, are attained in accordance with the present invention by exposing the carrier, containing free-flowing material, to an accelerated air stream to thereby tear the carrier apart to form flakes, and subjecting the flakes to vibration.

It is yet another object of the present invention to provide an improved apparatus for carrying out the process of separating components of a carrier containing free-flowing material.

This object is attained in accordance with the present invention by providing an air accelerator for exposing the carrier to an accelerated air stream to thereby tear the carrier apart to form flakes, at least one separation deck positioned as structural unit downstream of the air accelerator and including a screen surface and a trough, and a vibratory unit for oscillating the separation deck, thereby subjecting the flakes to vibrations.

It has been surprisingly found that the application of a highly accelerated air stream results in a tearing of the mat-like carrier into flakes which then have a size and quality suitable for an efficient recycling. This type of disintegration has many advantages compared to mechanical comminuting devices, such as cutter mills, tearing machines or choppers. The velocity of the air stream for realizing the tearing process depends on the type of material as well as on the quantity of material being used. Typically, the speed of the air stream may range between 80 to 100 m/s.

The high degree of separation realized by the process according to the invention, can be influenced through appropriate variation of the parameters. Susceptibility to mechanical failure, such as clogging of the tearing drums, lump formation, overheating of the material and a resultant danger of fire, can now be eliminated.

The air stream effectuates already a partial extraction of free-flowing absorbent material from the cellulose flakes because the absorbent material has a relatively high bulk density with respect to the cellulose flakes. During subsequent separation process by means of the separation decks and exposure of the mixture of cellulose flakes and absorbent material to vibrations, the flakes are sufficiently separated to enable their return to the production cycle.

Frequency and amplitude of the vibratory unit can be selected to realize a sharply defined separation of the components. The amplitude of the oscillations also depends on the type of material as well as on the quantity of material being used and may range typically between 7 to 11 mm, while the frequency remains constant. Through subsequent screening and sifting, the extracted absorbent material from cellulose fibers can even further be refined.

In accordance with the invention, the starting material can thus be practically fully recovered for subsequent reuse. A waste disposal or energetic processing, required heretofore, is eliminated. Costs for disposal are therefore saved and production costs for newly made articles are reduced as reclaimed material is used for the manufacture of these articles. The cost efficiency is significant because such hygienic articles, as stated above, are produced on a large scale.

According to another feature of the present invention, the apparatus includes a plurality of such separation decks which are lined-up in a stair-like manner and partially overlap one another. Suitably, the alignment of the separation decks is adjustable such that their inclination can be varied with respect to the respectively subjacent separation deck.

According to still another feature of the present invention, the vibratory unit may include at least one vibratory duct positioned laterally of the separation decks for transport of separated materials for further processing. The vibratory duct may include two parts with an intermediate bottom therebetween, and may have adjusting means for adjusting an inclination thereof.

BRIEF DESCRIPTION OF THE DRAWING

The above and other objects, features and advantages of the present invention will now be described in more detail with reference to the accompanying drawing, in which.

DETAILED DESCRIPTION OF A PREFERRED EMBODIMENT

Figure 1:
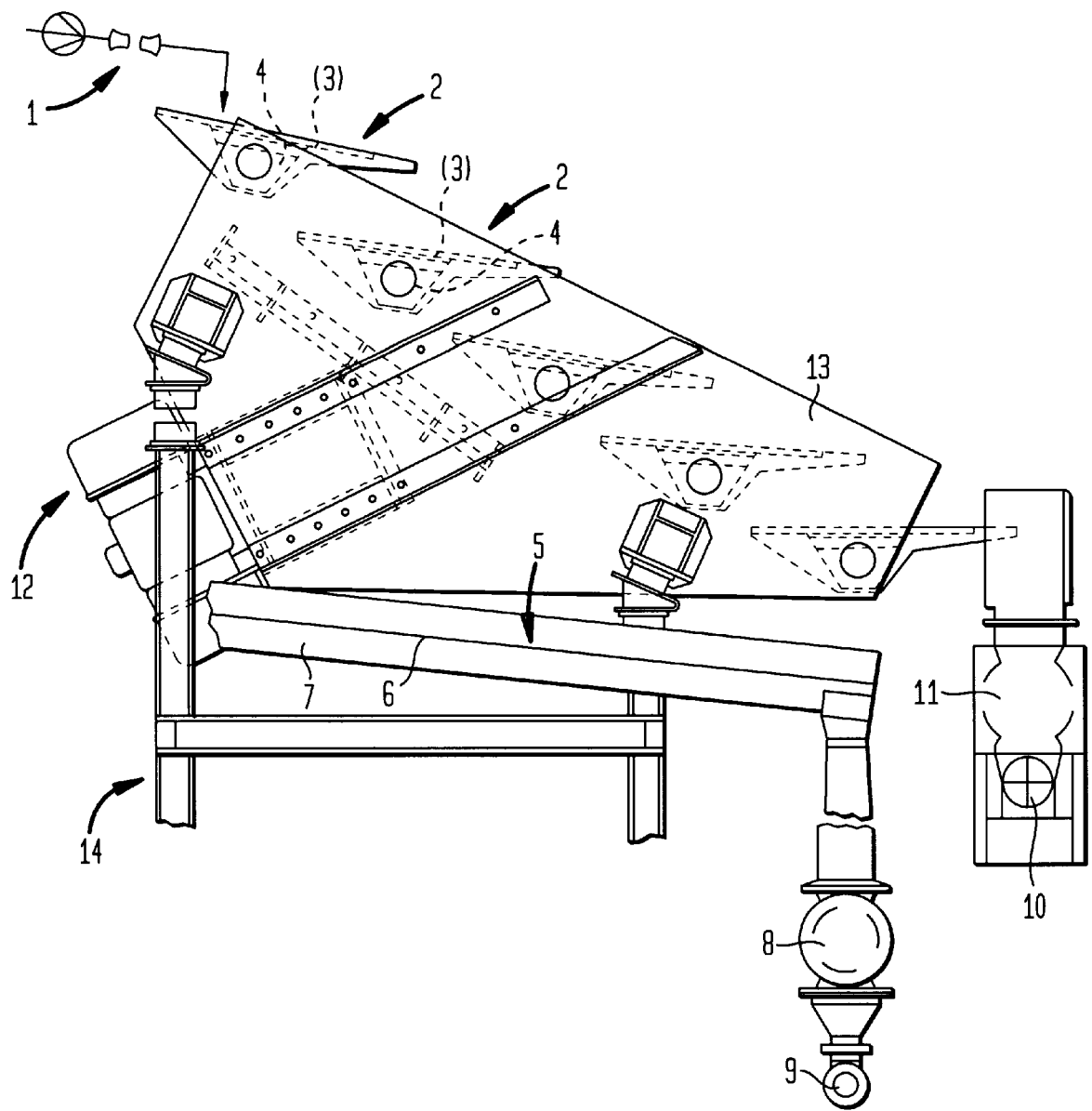
FIG. 1 is schematic side view of an apparatus for separating components of a free-flowing material in accordance with the present invention.
Figure 2:
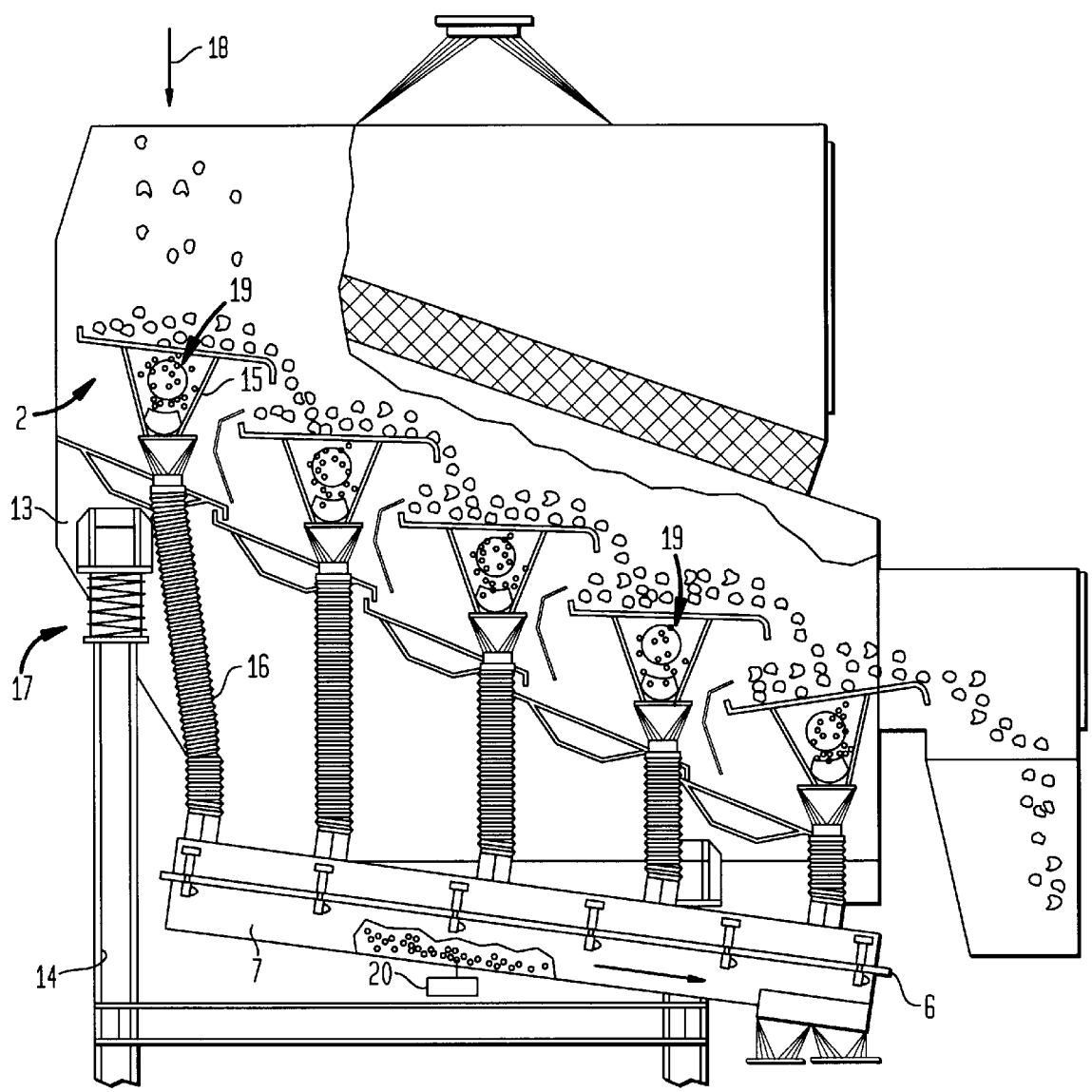
FIG. 2 is a side elevation of the apparatus of FIG. 1, showing the interconnection between separation decks and a double vibratory duct assembly
Figure 3:
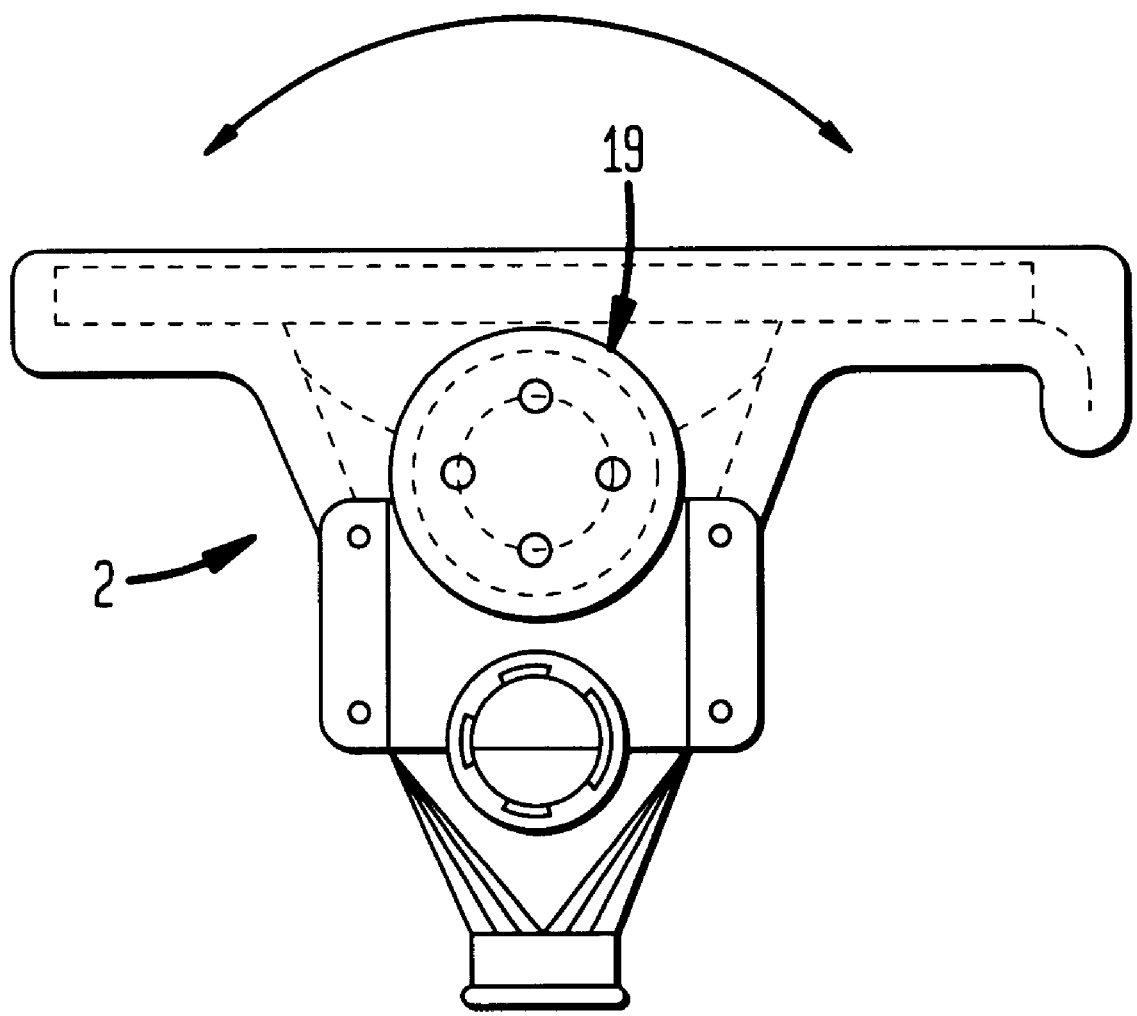
FIG. 3 shows a schematic illustration of a separation deck.

Turning now to FIGS. 1 and 2, there are shown an apparatus for separating cellulose and absorbent material contained in a cotton-type, mat-like carrier, in accordance with the present invention. The apparatus includes an air accelerator 1 in which the carrier is exposed to a highly accelerated air stream that tears apart the carrier and disintegrates the carrier into flakes. The velocity of the air stream for realizing the tearing process depends on the type of material as well as on the quantity of material being used. Typically, the speed of the air stream may range between 80 to 100 m/s. Positioned downstream of the air accelerator 1 are several separation decks 2 which are lined up in succession at different horizontal planes in a stepped formation, with the uppermost separation deck 2 being associated to the air accelerator 1. The separation decks 2 are each adjustably mounted by an integrated disk mechanism, denoted generally by reference numeral 19, and shown in FIG. 3 in a casing 13 so that the inclination of each separation deck 2 with respect to a respectively subjacent separation deck 2 can be varied as indicated by the double arrow in FIG. 3 and in particular illustrated in FIG. 2, which shows different angled dispositions of the separation decks 2. The casing 13 is resiliently secured on a stationary frame 14 via oscillation dampers 17.

The casing 13 including the separation decks 2 are commonly exposed to vibrations applied by two unbalance motors 12 (only one is shown in FIG. 1) which are secured to the casing 13 in confronting disposition. Frequency and amplitude of the unbalance motors 12 can be precisely defined to apply a desired oscillation of the separation decks 2. Typically, the amplitude of oscillations may range between 7 to 11 mm, while the frequency remains constant, but is dependant on the type of material as well as on the quantity of material being used. The entire vibratory unit including the unbalance motors 12 is thus mounted to the casing 13 which in turn is secured onto the frame 14 via interposed oscillation dampers 17. The casing 13 has a substantially hood-shaped configuration and is vented to ensure a dust-free operation.

Each separation deck 2 includes a trough 4, which is covered by a screen surface 3, and effects in conjunction with the applied vibrations an extraction of absorbent material from the cellulose flakes. Extracted absorbent material drops past the screen surface 3 of each separation deck 2 into the trough 4 and is directed by two lateral guide plates 15 (FIG. 2) in a free fall via a flexible tube 16 into a vibratory duct assembly, generally designated by reference numeral 5 and including two vibratory ducts (only one is shown in the drawing). The double vibratory duct assembly 5 forms an integrated vibratory body that is oscillated also by the unbalance motors 12 and has means to adjust an inclination thereof relative to the separation decks 2, as indicated schematically at 20 in FIG. 2. Each vibratory duct is composed of two parts and includes a conduit of substantially trough-shaped configuration which has incorporated therein an intermediate sieve bottom 6. It will be appreciated by persons skilled in the art that the conduit may exhibit also suitable geometric configurations.

Vibration and suitable inclination of the separation decks 2 causes the cellulose flakes lying on the screen surface 3 of the uppermost separation deck 2 to move forwardly until dropping onto the subjacent second separation deck 2, while absorbent material migrates through the sieve surface 3 into the trough 4. The inclination of the separation deck 2 is determinative for the transport speed of the flakes and can thus be optimized. After passing from one separation deck 2 to the next separation deck 2, the cellulose flakes are ultimately discharged via a rotary feeder 11 and transported pneumatically to a production device, with air being used for venting and conveying purposes.

Absorbent material extracted from the cellulose flakes during their passage from one separation deck 2 to the next separation deck 2, and migrating through the screen surface 3 of each separation deck 2, is conducted to the double vibratory duct assembly 5 for further refining, with the angle of inclination of each vibratory duct being so adjusted as to best suit the product stream. In the upper deck of each vibratory duct, i.e. in the area above the intermediate sieve bottom 6, residual cellulose flakes are separated and ultimately sucked off, while absorbent material drops through the intermediate sieve bottom 6 into the lower duct bottom 7 and is conveyed via an associated rotary feeder 8 to a transport conduit 9 for subsequent pneumatic conveyance, whereby each vibratory duct is operatively connected to a rotary feeder 8. A separator (not shown) separates the absorbent material from the air flow.

Absorbent material with residual contamination may subsequently be conducted via a metering device (not shown) to a sieve (not shown) which is vented. Material passing through the sieve is then finally purified in a sifter, with the sieve overflow being separately detected. Material comprised of cellulose flakes and absorbent material and falling down during vibration is collected underneath the separation decks 2. A conveyor worm 10 transports this material back for reunification with the starting material fed into the apparatus, as indicated by arrow 18 in FIG. 2. Thus, a closed system without loss of material is realized.

While the invention has been illustrated and described as embodied in a process of and apparatus for separating components of free-flowing material contained in a cotton-type, mat-like carrier, it is not intended to be limited to the details shown since various modifications and structural changes may be made without departing in any way from the spirit of the present invention.

What is claimed as new and desired to be protected by Letters Patent is set forth in the appended claims:

What is claimed is:

1. A process for separating free-flowing absorbent material contained in a dry mat-like carrier, comprising the steps of:

exposing the dry carrier to an air stream at increasing velocity, thereby tearing the dry carrier apart to form flakes; and subjecting the flakes to vibration to thereby effect an extraction of absorbent material from the flakes.

2. The process of claim 1 wherein extracted absorbent material is conducted into a vibratory duct for further refining the absorbent material.

3. Apparatus for separating free-flowing absorbent material contained in a dry mat-like carrier, comprising:

an air accelerator exposing the dry carrier to an air stream at increasing velocity to thereby tear apart the dry carrier and form flakes;

a separator positioned downstream of the air accelerator, and a vibratory means for oscillating the separator, thereby extracting absorbent material from the flakes.

4. The apparatus of claim 3 wherein the separator includes a plurality of separation decks positioned successively in downstream direction in a stair-like manner, with the plurality of separation decks partially overlapping one another.

5. The apparatus of claim 4 wherein each of the plurality of separation decks has adjusting means for adjusting an inclination thereof with respect to a subjacent one of the separation decks.

6. The apparatus of claim 3, and further comprising at least one duct positioned laterally of the separator and oscillated by the vibratory means for transport of separated materials for further processing.

7. The apparatus of claim 6 wherein the duct is made of two parts and includes an intermediate sieve bottom, said duct having adjusting means for adjusting an inclination thereof.

8. The apparatus of claim 3 wherein the air stream is conveyed at increasing velocity between 80 to 100 m/s.

9. The apparatus of claim 3 wherein the carrier includes cellulose.

10. The apparatus of claim 3 wherein the separator includes a separation deck having a trough and a screen surface covering the trough.

11. The apparatus of claim 3 and further comprising a casing, said separator including a plurality of said one separation deck mounted to the casing and arranged successively in a stair-like configuration, with successive separation decks partially overlapping one another.

12. The apparatus of claim 11 wherein each said separation deck has adjusting means for adjusting an inclination of the separation deck with respect to a subjacent one of the separation decks.

13. The apparatus of claim 11 wherein the vibratory means includes an unbalance motor secured to the casing for oscillating the separation decks.

14. The apparatus of claim 10 wherein the separator further includes a vibratory duct connected to and extending beneath the separation deck for refining extracted absorbent material.

15. The apparatus of claim 14 wherein the vibratory duct includes a trough which is partitioned by a screen bottom destined to allow passage of absorbent material.

* * * * *